Figure 1:
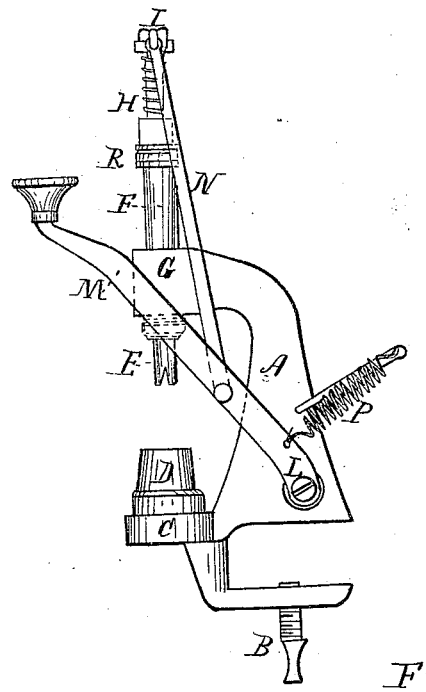
Figure 2:
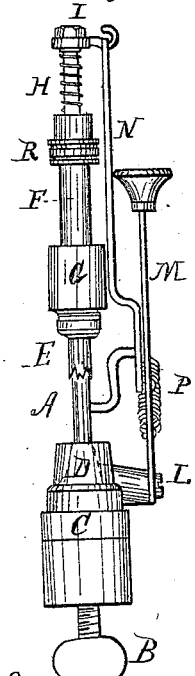
Figure 3:
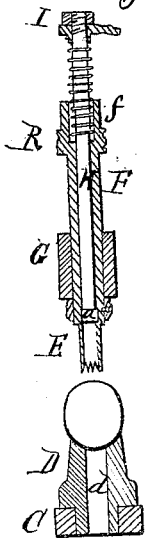
Figure 2:
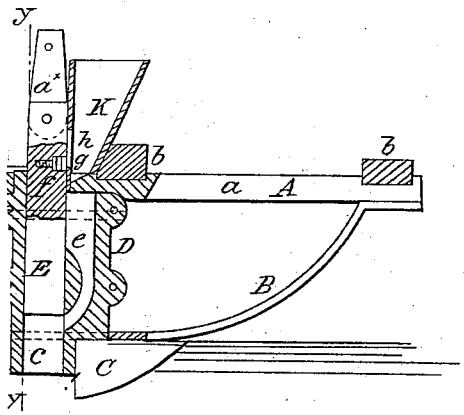
Figure 2:
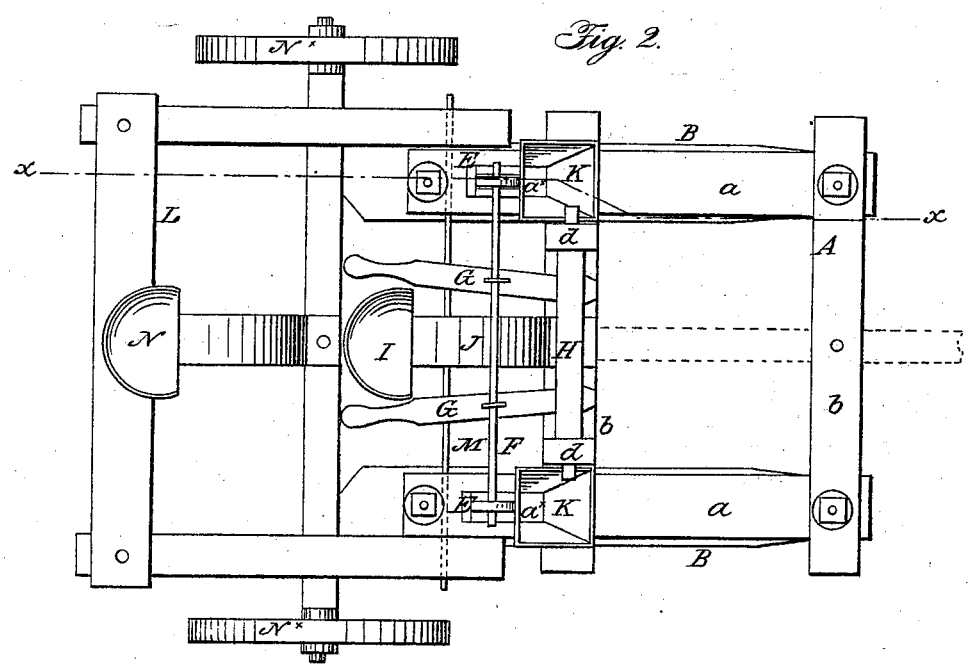

S. A. Russell.
Fruit Seeder.
No. 71,069. Patented Nov. 19, 1867.

Witnesses

Inventor
Samuel A. Russell
by his Attorney

IPSON.

anter

Patented Nov. 19, 1867.

Witnesses:
Theo. Tusche
J. A. Fraser

Inventor:
J. M. Sampson
per Munn & Co.
Attys